(12) United States Patent
Whitley

(10) Patent No.: US 10,988,329 B2
(45) Date of Patent: Apr. 27, 2021

(54) VEHICLE RESTRAINT

(71) Applicant: ASSA ABLOY Entrance Systems AB, Landskrona (SE)

(72) Inventor: L. Blake Whitley, Arlington, TX (US)

(73) Assignee: ASSA ABLOY Entrance Systems AB, Landskrona (SE)

( * ) Notice: Subject to any disclaimer, the term of this patent is extended or adjusted under 35 U.S.C. 154(b) by 153 days.

(21) Appl. No.: 16/277,444

(22) Filed: Feb. 15, 2019

(65) Prior Publication Data

US 2020/0262663 A1 Aug. 20, 2020

(51) Int. Cl.
*B65G 69/00* (2006.01)

(52) U.S. Cl.
CPC .................. *B65G 69/003* (2013.01)

(58) Field of Classification Search
CPC .................................................. B65G 69/003
See application file for complete search history.

(56) References Cited

U.S. PATENT DOCUMENTS

| | | |
|---|---|---|
| 2,801,011 A | 7/1957 | Overlach et al. |
| 3,305,049 A | 2/1967 | Willey |
| 4,207,019 A | 6/1980 | Cone |
| 4,208,161 A | 6/1980 | Hipp et al. |
| 4,264,259 A | 4/1981 | Hipp et al. |
| 4,282,621 A | 8/1981 | Anthony et al. |
| 4,400,127 A | 8/1983 | Metz |
| 4,443,150 A | 4/1984 | Hahn et al. |
| 4,472,099 A | 9/1984 | Hipp et al. |
| 4,555,211 A | 11/1985 | Metz |
| 4,560,315 A | 12/1985 | Hahn |
| 4,605,353 A | 8/1986 | Olson et al. |
| 4,634,334 A | 1/1987 | Hahn et al. |
| 4,664,582 A | 5/1987 | Edmeads et al. |
| 4,674,941 A | 6/1987 | Hageman et al. |
| 4,679,974 A | 7/1987 | Blunden |
| 4,695,216 A | 9/1987 | Erlandsson et al. |
| 4,759,678 A | 7/1988 | Hageman |

(Continued)

FOREIGN PATENT DOCUMENTS

| | | |
|---|---|---|
| CA | 2234974 A1 | 10/1999 |
| CA | 2297384 A1 | 2/2001 |

(Continued)

OTHER PUBLICATIONS

Automatic Wheel Restraint Surface Mounted User's Manual, Apr. 2006, SPX Dock Products, Inc., 44 pages.

(Continued)

*Primary Examiner* — Mark C Hageman
(74) *Attorney, Agent, or Firm* — Perkins Coie LLP

(57) ABSTRACT

Vehicle restraints for use at loading docks are described herein. In some embodiments, a vehicle restraint includes a vertically-moving carriage that is operably coupled to a guide track by means of one or more sliding members instead of, or in conjunction with, rollers. The sliding members can have relatively large contact surfaces configured to react the majority of vehicle pull loads applied to the vehicle restraint in use. Because of the relatively large contact surfaces, the pull loads are spread out over a relatively large area of the guide track, thereby reducing the likelihood for the loads to deform or otherwise damage the guide track.

19 Claims, 6 Drawing Sheets

(56) References Cited

U.S. PATENT DOCUMENTS

| | | |
|---|---|---|
| 4,784,567 A | 11/1988 | Hageman et al. |
| 4,815,918 A | 3/1989 | Bennett et al. |
| RE32,968 E | 6/1989 | Hahn |
| 4,861,217 A | 8/1989 | Erlandsson |
| 4,865,508 A | 9/1989 | Carlson et al. |
| 4,915,568 A * | 4/1990 | West ............ B65G 69/003 14/71.1 |
| 4,938,647 A | 7/1990 | Erlandsson et al. |
| 4,969,792 A | 11/1990 | Ellis et al. |
| 4,973,213 A | 11/1990 | Erlandsson et al. |
| 4,988,254 A | 1/1991 | Alexander |
| 5,026,242 A | 6/1991 | Alexander |
| 5,071,306 A | 12/1991 | Alexander |
| 5,096,359 A | 3/1992 | Alexander |
| 5,120,181 A | 6/1992 | Alexander |
| 5,212,846 A | 5/1993 | Hahn et al. |
| 5,249,905 A | 10/1993 | Warner et al. |
| 5,259,718 A | 11/1993 | Alexander |
| 5,297,921 A | 3/1994 | Springer et al. |
| 5,336,033 A | 8/1994 | Alexander |
| 5,346,353 A | 9/1994 | Alexander |
| 5,375,965 A | 12/1994 | Springer et al. |
| 5,454,682 A | 10/1995 | Alexander |
| 5,505,575 A | 4/1996 | Alexander |
| 5,531,557 A | 7/1996 | Springer |
| 5,553,987 A | 9/1996 | Ellis |
| 5,582,498 A | 12/1996 | Springer et al. |
| 5,664,930 A | 9/1997 | Ellis |
| 5,683,219 A | 11/1997 | Gilles et al. |
| 5,709,518 A | 1/1998 | Alexander et al. |
| 5,743,697 A | 4/1998 | Alexander |
| 5,762,459 A | 6/1998 | Springer et al. |
| 5,896,957 A | 4/1999 | Berends et al. |
| 5,927,928 A | 7/1999 | Hageman et al. |
| 5,934,857 A | 8/1999 | Alexander |
| 5,964,572 A | 10/1999 | Hahn et al. |
| 6,062,796 A | 5/2000 | Alexander |
| 6,082,952 A | 7/2000 | Alexander |
| 6,092,970 A | 7/2000 | Hahn et al. |
| 6,123,496 A | 9/2000 | Alexander |
| 6,139,242 A | 10/2000 | Alexander |
| 6,162,005 A | 12/2000 | Fritz |
| 6,238,163 B1 | 5/2001 | Springer et al. |
| 6,250,432 B1 | 6/2001 | Hageman et al. |
| 6,276,496 B1 | 8/2001 | Hageman et al. |
| 6,322,311 B1 | 11/2001 | Alexander et al. |
| 6,336,527 B1 | 1/2002 | Metz et al. |
| RE37,570 E | 3/2002 | Springer et al. |
| 6,357,987 B1 | 3/2002 | Palus |
| 6,368,043 B1 | 4/2002 | Leum et al. |
| 6,371,253 B1 | 4/2002 | Berends et al. |
| 6,390,245 B1 | 5/2002 | Metz et al. |
| 6,478,525 B2 | 11/2002 | Hageman et al. |
| 6,488,464 B1 * | 12/2002 | Kish ............ B65G 69/003 414/401 |
| 6,505,713 B1 | 1/2003 | Paul et al. |
| 6,524,053 B2 | 2/2003 | Hahn et al. |
| 6,589,003 B2 | 7/2003 | Berends |
| 6,676,360 B2 | 1/2004 | Springer et al. |
| 6,690,287 B2 | 2/2004 | Jette et al. |
| 7,032,720 B2 | 4/2006 | Jette et al. |
| 7,056,077 B2 | 6/2006 | Pedersen |
| 7,226,265 B2 | 6/2007 | Wilson |
| 7,264,092 B2 | 9/2007 | Jette |
| 7,864,030 B2 | 1/2011 | Jetté et al. |
| 8,286,757 B2 | 10/2012 | Nelson et al. |
| 8,287,223 B2 | 10/2012 | Andersen et al. |
| 8,307,956 B2 | 11/2012 | Andersen et al. |
| 8,499,897 B2 | 8/2013 | Brooks et al. |
| 8,528,929 B2 | 9/2013 | Kimener |
| 8,529,183 B2 | 9/2013 | Ion |
| 8,532,816 B2 | 9/2013 | Ion |
| 8,590,674 B2 | 11/2013 | Jette et al. |
| 8,596,949 B2 | 12/2013 | Harrington et al. |
| 8,678,736 B2 | 3/2014 | Andersen et al. |
| 8,905,198 B2 | 12/2014 | Cotton et al. |
| 9,126,775 B2 | 9/2015 | Brooks et al. |
| 9,139,384 B2 | 9/2015 | Brooks, IV et al. |
| 9,145,273 B2 | 9/2015 | Brooks et al. |
| 9,694,790 B2 | 7/2017 | Kimener |
| 9,751,702 B1 | 9/2017 | Hoofard et al. |
| 2002/0136620 A1 | 9/2002 | Berends |
| 2002/0141852 A1 | 10/2002 | Hahn et al. |
| 2003/0159892 A1 | 8/2003 | Jette |
| 2003/0170097 A1 | 9/2003 | Pedersen et al. |
| 2004/0005210 A1 | 1/2004 | Alexander et al. |
| 2005/0133315 A1 | 6/2005 | Hoofard |
| 2005/0226705 A1 | 10/2005 | Wilson |
| 2006/0051196 A1 | 3/2006 | McDonald |
| 2006/0136782 A1 | 6/2006 | Corniot |
| 2006/0144649 A1 | 7/2006 | Jette |
| 2006/0182559 A1 | 8/2006 | Gleason et al. |
| 2007/0248440 A1 | 10/2007 | Andersen et al. |
| 2008/0124203 A1 | 5/2008 | McDonald |
| 2009/0026022 A1 | 1/2009 | Andersen et al. |
| 2009/0155030 A1 | 6/2009 | Andersen et al. |
| 2009/0194375 A1 | 8/2009 | Andersen et al. |
| 2009/0194376 A1 | 8/2009 | Brooks et al. |
| 2009/0223764 A1 | 9/2009 | Andersen et al. |
| 2010/0260585 A1 | 10/2010 | Sander et al. |
| 2010/0260586 A1 | 10/2010 | Manone et al. |
| 2011/0158778 A1 | 6/2011 | Harrington et al. |
| 2011/0162916 A1 | 7/2011 | Salinger et al. |
| 2011/0176896 A1 | 7/2011 | Andersen et al. |
| 2011/0264270 A1 | 10/2011 | Ion |
| 2012/0006632 A1 | 1/2012 | Nelson |
| 2012/0234087 A1 | 9/2012 | Strahan et al. |
| 2013/0292214 A1 | 11/2013 | Brooks et al. |
| 2014/0255134 A1 | 9/2014 | Brooks, IV et al. |
| 2015/0191319 A1 | 7/2015 | Muhl et al. |
| 2015/0239686 A1 | 8/2015 | Stone et al. |
| 2016/0090072 A1 | 3/2016 | Eppley et al. |

FOREIGN PATENT DOCUMENTS

| | | |
|---|---|---|
| DE | 4120035 A1 | 12/1992 |
| DE | 4427406 C1 | 10/1995 |
| EP | 0452519 A1 | 10/1991 |
| EP | 0609049 A1 | 8/1994 |
| EP | 0684915 A1 | 12/1995 |
| EP | 0775653 A1 | 5/1997 |
| EP | 1112950 A1 | 7/2001 |
| EP | 1764275 A1 | 3/2007 |
| EP | 2170663 A1 | 4/2010 |
| EP | 2796395 A1 | 10/2014 |
| FR | 2736336 A1 | 1/1997 |
| WO | 9518029 A1 | 7/1995 |
| WO | 199935067 A1 | 7/1999 |
| WO | 2004078618 A1 | 9/2004 |
| WO | 2009032372 A1 | 3/2009 |
| WO | 2009100146 A1 | 8/2009 |
| WO | 2009111244 A1 | 9/2009 |
| WO | 2009139946 A1 | 11/2009 |
| WO | 2010090884 A1 | 8/2010 |
| WO | 2010118032 A1 | 10/2010 |
| WO | 2014137874 A1 | 9/2014 |
| WO | 2015077893 A1 | 6/2015 |

OTHER PUBLICATIONS

Vehicle Restraints, Safety Chock Series SLSC 2000, User's Manual, Sep. 1999, SERCO, 32 pages.

* cited by examiner

VEHICLE RESTRAINT

TECHNICAL FIELD

The present disclosure is generally related to vehicle restraints and, more particularly, to vehicle restraints for restraining transport trailers, trucks, and/or other vehicles at loading docks.

BACKGROUND

Vehicle restraints are well known in the material handling industry and are typically used to prevent a trailer or other transport vehicle from moving away from a loading dock during the loading and/or unloading process. Absent a restraint, the vehicle may tend to move away from the loading dock for a number of reasons, such as the slope of the driveway, the kinetic energy imparted to the vehicle by a fork truck or personnel during the loading or unloading process, etc. If the vehicle is allowed to move away from the dock face, a gap may form between the vehicle and the dock face or the vehicle and the lip of an associated dock leveler. If this occurs, a fork truck operator could inadvertently drive into the gap, or other personnel could inadvertently step into the gap, potentially damaging equipment or injuring personnel.

Unlike wheel chocks, conventional vehicle restraints typically engage the Rear Impact Guard ("RIG") bar of the vehicle. As is well known, RIG bars (which can also be referred to as "ICC" bars) are horizontal members that extend across the rear of the vehicle below the bed. In the U.S., regulations require that the vertical distance between the bottom edge of the RIG bar and the ground not exceed 22 inches at any point across the full width of the member, and that the rearmost surface of the RIG bar be within 12 inches of the rear extremity of the vehicle.

There are several different types of vehicle restraint. One type employs a restraining member (e.g., a hook) operably coupled to a vertically-moving carriage having rollers that ride on a track mounted to the face of the loading dock. Examples of such restraints are disclosed in U.S. Pat. Nos. 4,472,099, 4,443,150, 4,282,621, 4,264,259, 4,695,216 and 6,162,005, each of which is incorporated herein by reference in its entirety. The use of a vertically-moving carriage provides a range of motion to engage RIG bars at different heights. Some of these restraints are designed to operate in response to vehicle impact. More specifically, to operate the restraint the vehicle backs into the loading dock until the RIG bar contacts an angled lead-in surface of the restraint carriage, causing the carriage to move downwardly on the track as the RIG bar continues moving back for engagement by the locking hook. The repeated shock of the RIG bar on such systems can cause significant component wear. As a result, this type of RIG bar restraint generally requires relatively high maintenance to service the moving carriage and related parts.

Additionally, the carriage rollers on this type of restraint can be subjected to relatively high restraint loads while moving up and down in response to vehicle loading and unloading. For example, in conventional vertically-moving carriage restraints, the carriage is carried by steel rollers that ride in left and right channels of the vertical track. The carriage includes two rollers on each side for engaging the corresponding channel: an upper roller near the top of the carriage and a lower roller near the bottom of the carriage. When the restraint hook is under load, the reaction load path into the dock structure is through the rollers and into the flanges of the track channels. However, the geometry is such that the upper rollers typically carry most of the vehicle loads, and high pull loads (e.g., more than 20,000 lbf) can lead to dimpling of the channel flanges where the upper rollers make contact. This in turn can cause the carriage to hang up on the track as it moves up and down during normal operation, which can adversely affect performance and frequently require time-consuming operator intervention for maintenance, etc.

Additionally, debris, sand and/or other particulates can accumulate in the roller bearings and/or the track, especially in locations with high exposure to sand, and this can damage the rollers and/or adversely affect the ability of the carriage to move up and down smoothly. Accordingly, it would be advantageous to provide an improved vertically-moving vehicle restraint that is less susceptible to damage from pull loads or sand and other debris than conventional restraints, while offering longer service life and higher reliability than conventional restraints.

DETAILED DESCRIPTION

Figure 1:
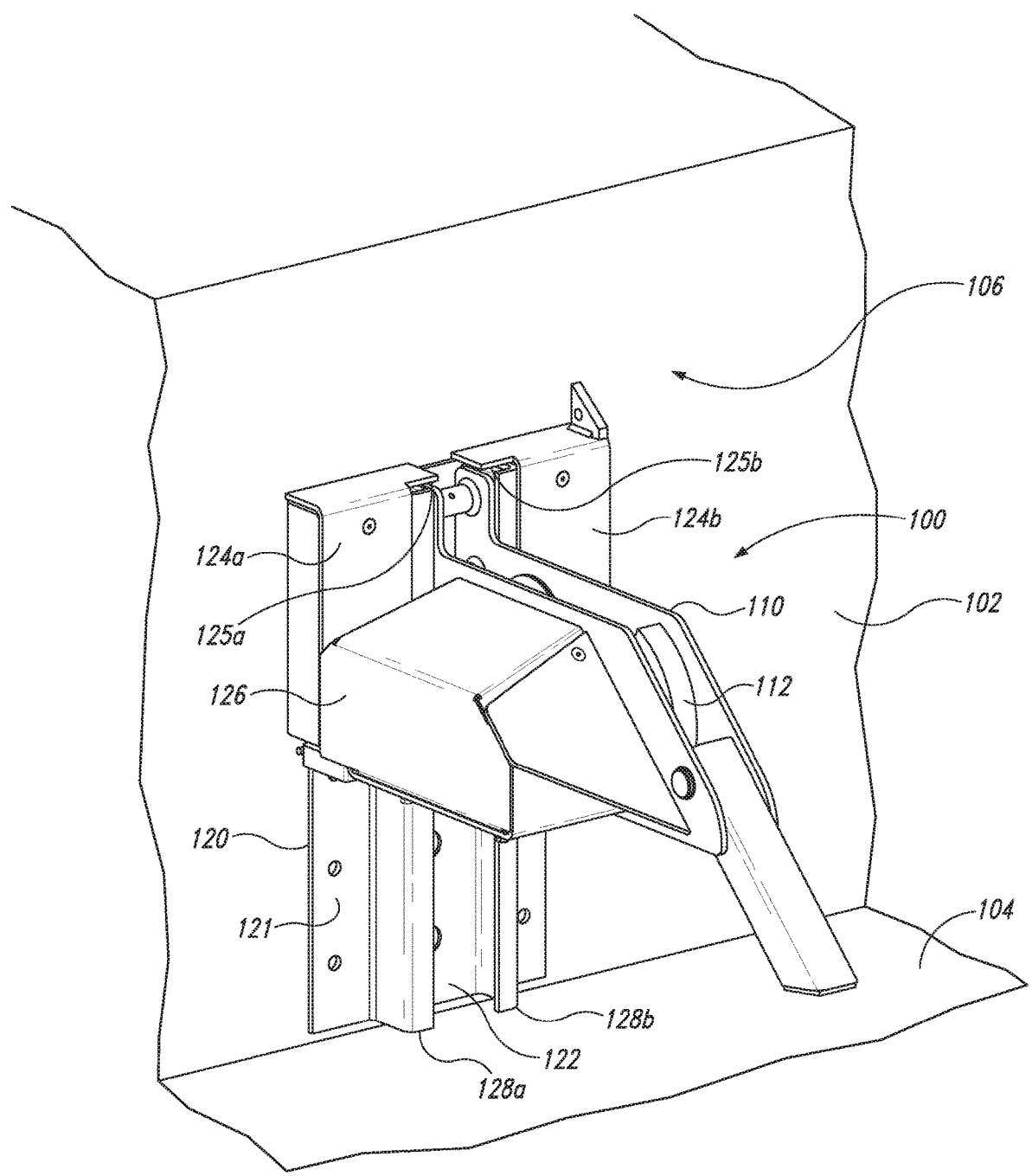
FIG. 1 is an isometric view of a vehicle restraint configured in accordance with embodiments of the present technology.

The following disclosure describes various embodiments of vehicle restraints for use at loading docks. The vehicle restraints described herein can include a track assembly that is configured to be mounted to the face of a loading dock, and a carriage assembly that is configured to be movably coupled to the track assembly. In some embodiments, the track assembly can include a guide track, and the carriage assembly can include one or more guide blocks that are slidably received in the guide track to movably couple the carriage assembly to the track assembly. One or more biasing members (e.g., tension springs) can be operably coupled between the carriage assembly and the track assembly to resiliently bias the carriage assembly toward an upper position on the guide track. In operation, the RIG bar of a vehicle contacts an angled surface of the carriage assembly as the vehicle backs into the loading dock, driving the carriage assembly downward against the biasing force of the biasing members. Once the vehicle is fully backed up to the dock face, a hook on the carriage assembly rotates upwardly to engage the RIG bar and restrain the vehicle.

As described in greater detail below, in contrast to conventional vehicle restraints in which the carriage assembly is coupled to the guide track solely by metal rollers, coupling the carriage assembly to the guide track by one or more guide blocks as described herein can provide a broader interface surface that spreads the vehicle loads over a greater portion of the guide track. As a result, the guide blocks reduce the tendency for high vehicle loads to dimple or otherwise damage the guide track and adversely affect restraint operation, service life, etc.

Certain details are set forth in the following description and in FIGS. 1-3 to provide a thorough understanding of various embodiments of the present technology. In other instances, well-known structures, materials, operations and/or systems often associated with loading docks, vehicle restraints, related hardware and manufacturing methods, etc. are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention. Many of the details, dimensions, angles and other features shown in the Figures are merely illustrative of some embodiments of the disclosure. Accordingly, other embodiments can have other details, dimensions, angles and features without departing from the spirit or scope of the present invention. In addition, those of ordinary skill in the art will appreciate that further embodiments of the invention can be practiced without several of the details described below.

In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

FIG. 1 is an isometric view of a vehicle restraint 100 configured in accordance with embodiments of the present technology. In the illustrated embodiment, the restraint 100 is fixedly mounted to a face 102 of a loading dock 106 above a driveway 104. As those of ordinary skill in the art will understand, the restraint 100 is typically positioned on the centerline, or at least close to the centerline, of the loading dock 106 at a suitable elevation above the driveway 104 for engaging a RIG bar of a trailer or other shipping vehicle (not shown). Additionally, those of ordinary skill in the art will understand that in some embodiments the loading dock can include a dock leveler (not shown) having a lip configured to extend into the trailer, and in these embodiments the lip of the dock leveler may be stored directly above the restraint 100.

The vehicle restraint 100 includes a carriage assembly 110 movably coupled to a track assembly 120. In some embodiments, the track assembly 120 includes a mounting plate 121 which can be fixedly attached to the dock face 102 by plurality of bolts or other suitable fasteners in a conventional manner. Additionally, the track assembly 120 can further include a guide track 122 having a first vertical channel 128a spaced apart from and facing a second vertical channel 128b. As described in greater detail below, the carriage assembly 110 can be resiliently biased toward an upper position on the track assembly 120 (as shown in FIG. 1) by one or more biasing members which are enclosed by a first cover 124a and a second cover 124b.

The carriage assembly 110 includes a vehicle engagement member (e.g., a restraint hook 112) configured to rotate upwardly and engage the RIG bar of a vehicle to restrain the vehicle at the loading dock 106. As described in greater detail below, in some embodiments the restraint hook 112 is configured to rotate upwardly and downwardly by operation of a motor (not shown in FIG. 1) enclosed in a housing 126.

Figure 2A:
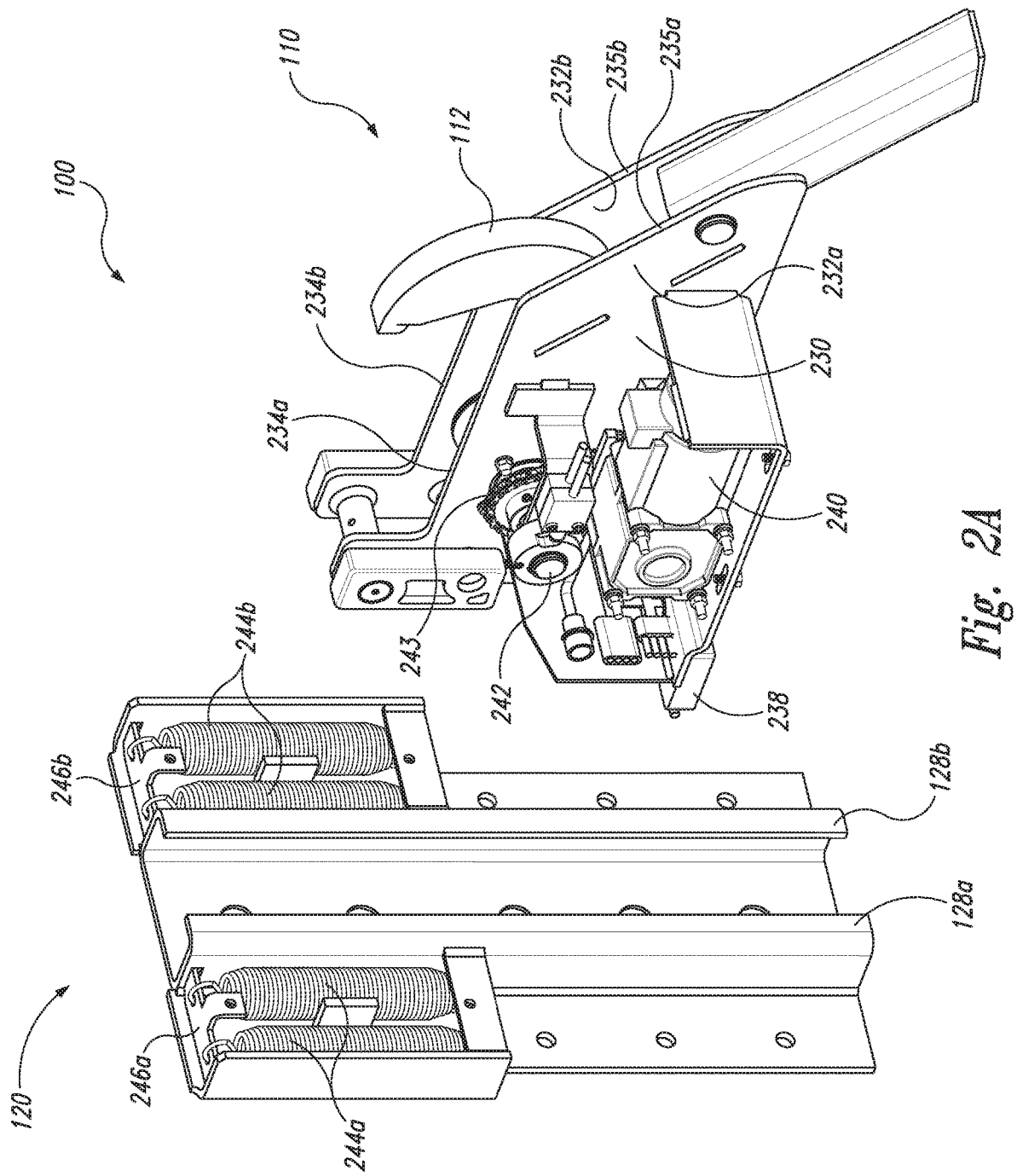
FIGS. 2A and 2B are partially exploded isometric views of the vehicle restraint of FIG. 1.
Figure 2B:
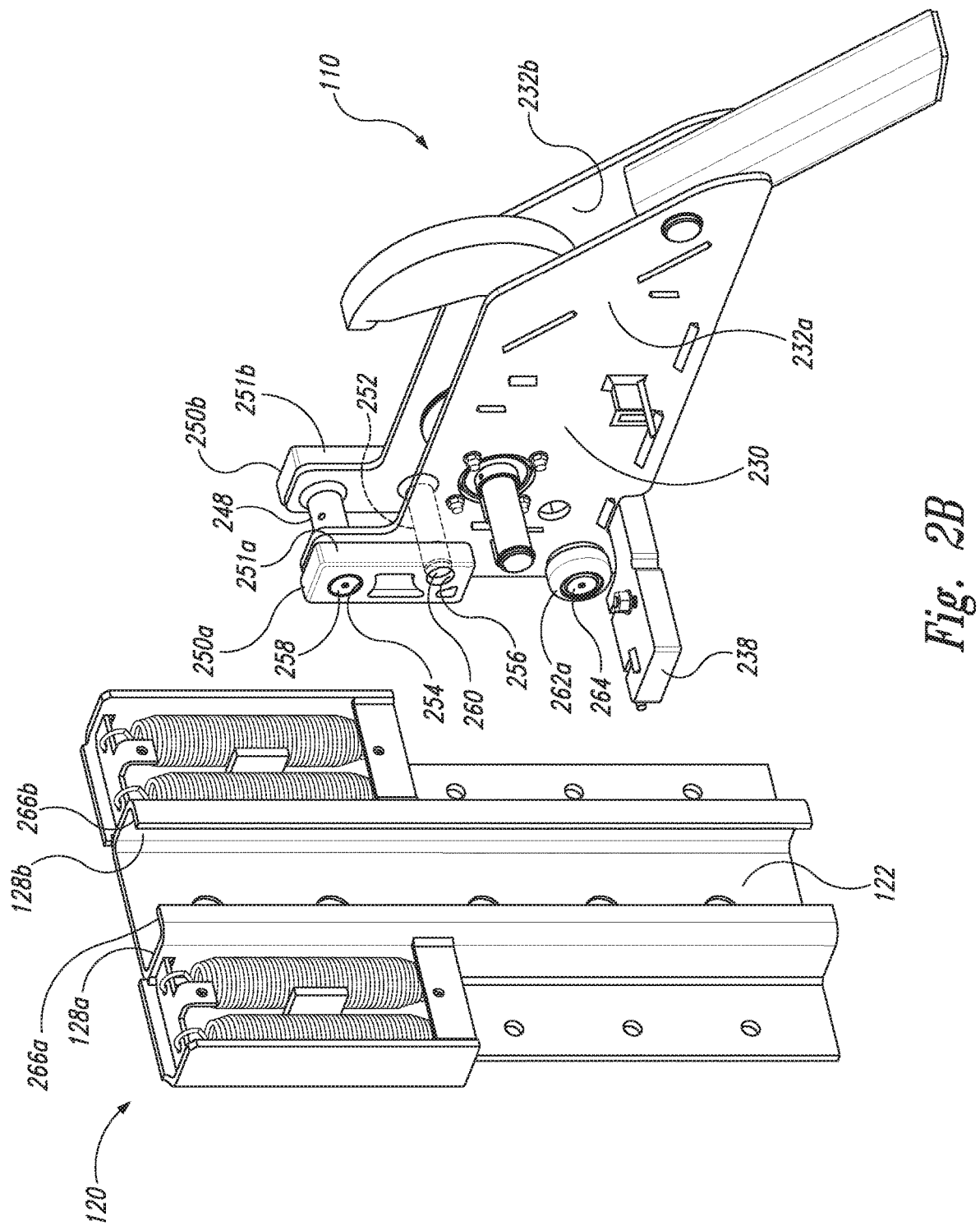
Figure 2C:
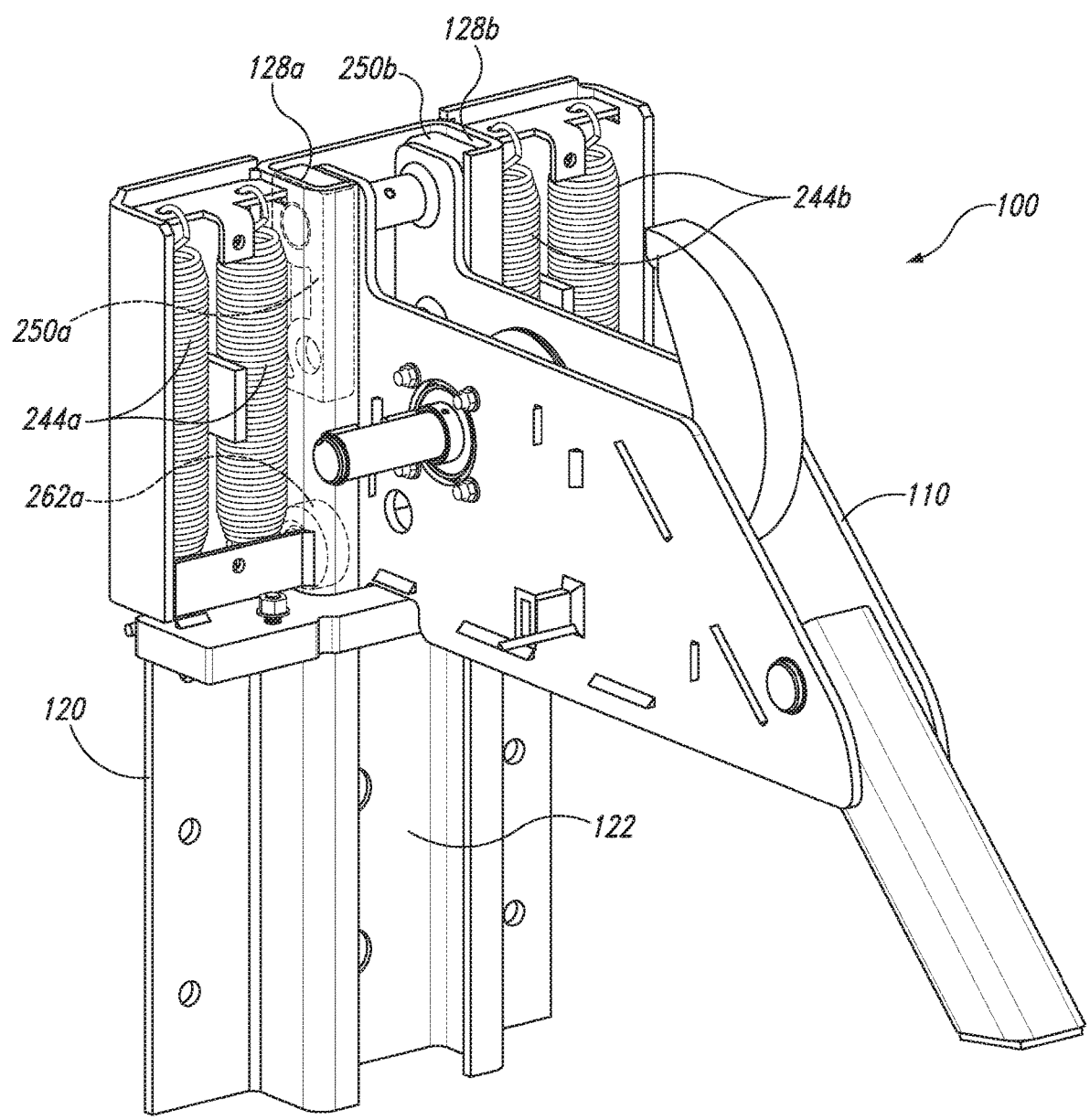
FIG. 2C is a partially assembled isometric view of the vehicle restraint.

FIG. 2A is a partially exploded isometric view of the vehicle restraint 110 with the covers 124a, b and the housing 126 (FIG. 1) removed for purposes of illustration and clarity. FIG. 2B is essentially the same as FIG. 2A, but with additional components of the carriage assembly 110 removed for further clarity; and FIG. 2C is a partially assembled isometric view of the vehicle restraint 100 configured in accordance with embodiments of the present technology. Referring first to FIG. 2A, the carriage assembly 110 includes a frame 230 having a first side plate 232a spaced apart from a second side plate 232b. Each of the side plates 232a, b includes an angled edge surface 235a, b, respectively, for initial contact with a RIG bar of a vehicle, and an adjacent horizontal edge surface 234a, b, respectively, for subsequent contact with the RIG bar. The restraint hook 112 is pivotally coupled to the frame 230 in the space between the first and second side plates 232a, b by means of a rotatable shaft 242. A motor 240 (e.g., an electric motor) is operably coupled to an end portion of the shaft 242 by, e.g., a suitable drive chain/sprocket arrangement 243. In operation, the motor 240 can be activated (by, e.g., a dock operator at a control panel) to rotate the shaft 242 in a first direction (e.g., counterclockwise) via the drive chain/sprocket arrangement 243 to raise the restraint hook 112 to the position shown in FIG. 2A for RIG bar engagement, and/or to rotate the shaft 242 in a second direction, opposite to the first direction (e.g., clockwise), to lower the restraint hook 112 to the stored position shown in FIG. 1.

The vehicle restraint 100 can further include a first pair of biasing numbers 244a and a second pair of biasing members 244b (e.g., coil tension springs). The upper end portions of the first pair of biasing members 244a can be operably attached to a first bracket 246a on the track assembly 120 (via, e.g., suitable mounting holes), and the lower end portions of the first pair of biasing members 244a can be operably attached to a spring bar 238 on the carriage assembly 110. The second pair of biasing members 244b can be operably attached to a second bracket 246b on the track assembly 120 and to the spring bar 238 in a similar manner. As described in greater detail below, the biasing members 244a, b bias the carriage assembly 110 toward to the upper position shown in FIG. 1, but enable the carriage assembly 110 to move resiliently downward as needed in response to contact from a vehicle RIG bar during RIG bar engagement. Additionally, the biasing members 244a, b enable the carriage assembly 110 to move upward and downward as needed after RIG bar engagement in response to vehicle loading and/or unloading.

Turning next to FIG. 2B, in this Figure the motor 240 and associated components have been omitted from the carriage assembly 110 for further clarity. In one aspect of this embodiment, the carriage assembly 110 further includes a first guide block 250a attached to an upper portion of the first side plate 232a, and a corresponding second guide block 250b attached to an upper portion of the second side plate 232b. More specifically, in the illustrated embodiment the carriage assembly 110 includes an upper cross-bar or shaft 248, a lower shaft 264, and a medial shaft 252 therebetween. Each of the shafts 248, 252 and 264 extend horizontally between the side plates 232a, b and have opposite end portions that extend beyond the corresponding side plates 232a, b. Each of the guide blocks 250a, b includes an upper hole 254 and a lower hole 256. The upper hole 254 can be shaped and sized to securely receive an end portion 258 of the upper shaft 248, and the lower hole 256 can be shaped and sized to securely receive an end portion 260 of the medial shaft 252 to securely mount the guide blocks 252a, b to the corresponding side plates 232a, b. In addition to being fitted onto the end portions 258 and 260 of the upper shaft 248 and the medial shaft 252, respectively, in some embodiments the guide blocks 250a, b can also be fastened to the corresponding side plate 232a, b with one or more fasteners (e.g., screws, bolts, etc.) and/or a suitable adhesive.

In the illustrated embodiment, the first and second guide blocks 250a, b (which can also be referred to as "sliders," "sliding members," "sliding blocks," "guide members," and the like) have the form of elongate, generally rectangular-shaped blocks which are configured to be slidably received in the corresponding channels 128a, b of the guide track 122. More specifically, each of the channels 128a, b includes a corresponding flange 266a, b, and each of the guide blocks 250a, b includes an elongate, generally flat, rectangular-shaped contact surface 251a, b configured to slide against the inner surface of the corresponding flange 266a, b. As described in greater detail below, because of the size of the flat contact surfaces 251a, b, the guide blocks 250a, b can distribute vehicle pull loads into the flanges 266a, b, respectively, over a larger contact area than could the round contact surfaces of, for example, conventional rollers.

The guide blocks 250a, b can be manufactured from various materials known in the art having suitable strength, coefficients of friction, hardness, etc. to provide good sliding and wear characteristics. For example, in some embodiments the guide blocks 250a, b can be manufactured from high strength polymers, such as Delrin® or other polyoxymethylenes or acetals. In other embodiments, the guide blocks 250a, b can be manufactured from other suitable low friction, wear-resistant plastics, thermoplastics, metals, composites, and/or other materials known in the art.

In addition to the guide blocks 250a, b, the carriage assembly 110 can further include a first roller 262a (e.g., a metal roller) rotatably mounted to a first end portion of the lower shaft 264, and a second roller 262b (not shown) rotatably mounted to an opposite second end portion of the lower shaft 264 adjacent to the second side plate 232b. Although the second roller 262b is not shown in FIG. 2B, the reader will understand that the second roller 262b is mounted to the second end portion the lower shaft 264 in a symmetric or mirror-image arrangement to the first roller 262a mounted on the first end portion of the lower shaft 264. In some embodiments, the rollers 262a, b can be formed from metal, Delrin®, or other polymers, and can include suitable roller bearings.

Although the illustrated embodiment includes an upper guide block 250 and a lower roller 262 mounted to each side of the frame 230, in other embodiments carriage assemblies configured in accordance with the present technology can omit the lower roller 262 and replace it with an additional guide block so that each side of the frame 230 includes an upper guide block and a lower guide block in vertical alignment. In yet other embodiments, the lower roller 262 can be omitted and the upper guide block 250 can be extended downwardly and engage the end portion of the lower shaft 264 to provide a single, extra-long guide block on each side of the frame 230.

FIG. 2C is an isometric view showing the carriage assembly 110 operably mounted to the track assembly 120 in accordance with embodiments of the present technology. As with FIG. 2B, a number of components of the restraint 100 have been omitted for purposes of illustration and clarity. As FIG. 2C illustrates, the first guide block 250a is slidably received in the first channel 128a, and the first roller 262a (FIG. 2B) is rollably received in the first channel 128a below the first guide block 250a. Similarly, the second guide block 250b is slidably received in the second channel 128b, and the second roller 262b (not shown) is rollably received in the second channel 128b below the second guide block 250b. The first and second pairs of biasing members 244a, b bias the carriage assembly 110 upwardly against corresponding flanges 125a, b of the covers 124a, b, respectively (FIG. 1).

Figure 3:
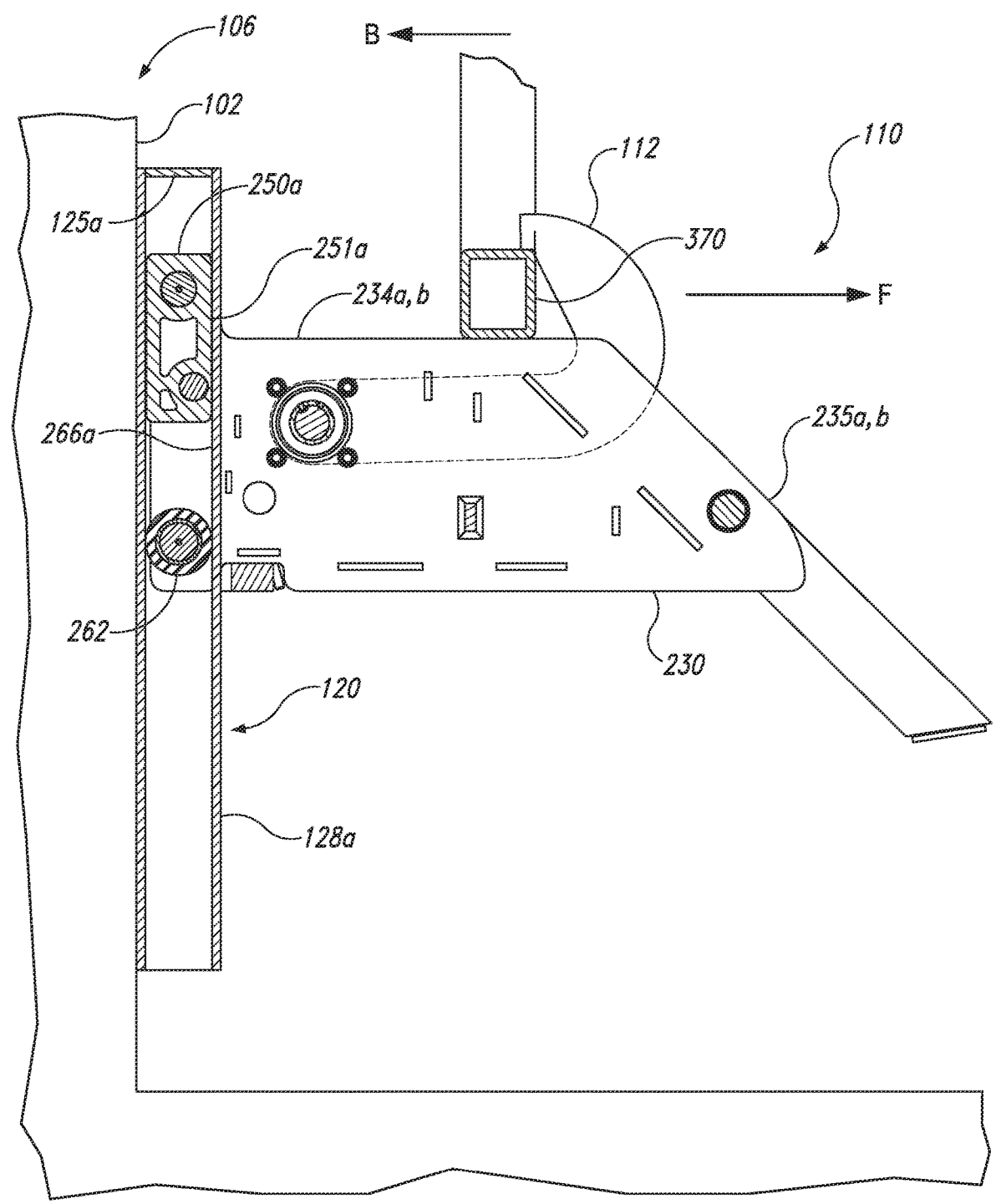
FIG. 3 is a side cross-sectional view of the vehicle restraint of FIG. 1 engaged with a vehicle RIG bar in accordance with embodiments of the present technology.

FIG. 3 is a side cross-sectional view of the vehicle restraint 100 mounted to the face 102 of the loading dock 106 in accordance with embodiments of the present technology. In operation, the guide blocks 250a, b are initially biased upwardly against the horizontal flanges 125a, b of the covers 124a, b of the track assembly 120 as shown in FIG. 1. As a vehicle backs up to the loading dock 106 in direction B, a RIG bar 370 on the vehicle initially contacts the angled contact surfaces 235a, b of the frame 230 and drives the carriage assembly 110 downwardly as the RIG bar 370 continues to move back toward the dock face 102. When the RIG bar 370 reaches the top of the angled contact surfaces 235a, b, the carriage assembly 110 stops moving downward and the RIG bar 370 continues sliding back on the horizontal contact surfaces 234a, b until the vehicle contacts the dock face 102 (and/or dock bumpers thereon). An operator (not shown) can then activate the motor 240 (FIG. 2A) via, e.g., a control panel inside the dock station to rotate the restraint hook 112 upwardly from the position shown in FIG. 1 to the position shown in FIG. 3 to engage the RIG bar 370, thereby restraining the vehicle at the dock face 102. Once the vehicle loading and/or unloading process is complete, the restraint hook 112 is rotated downwardly by the motor 240 into the stowed position shown in FIG. 1 so that the vehicle can depart the loading dock 106.

As FIG. 3 illustrates, the horizontal contact surfaces 234a, b of the frame 230 are horizontally aligned, or are at least approximately horizontally aligned, with the guide blocks 250a, b. This configuration enables the RIG bar 370 to be horizontally adjacent, or at least approximately horizontally adjacent, to the guide blocks 250a, b when engaged by the restraint hook 112. As a result, if/when the vehicle exerts a horizontal pull force against the restraint hook 112 in direction F, the majority of this force is applied to the flanges 266a, b of the guide track 122 by the corresponding guide blocks 250a, b. Because of the size of the flat contact surfaces 251a, b of the guide blocks 250a, b, however, this load is spread out over relatively large contact surfaces of the flanges 266a, b. Spreading the load out in the foregoing manner greatly reduces load concentration and the likelihood for the loads to cause dimpling or other damage to the flanges 266a, b, as could otherwise occur if these loads were carried into the flanges 266a, b by rollers at the upper locations.

Figure 4:
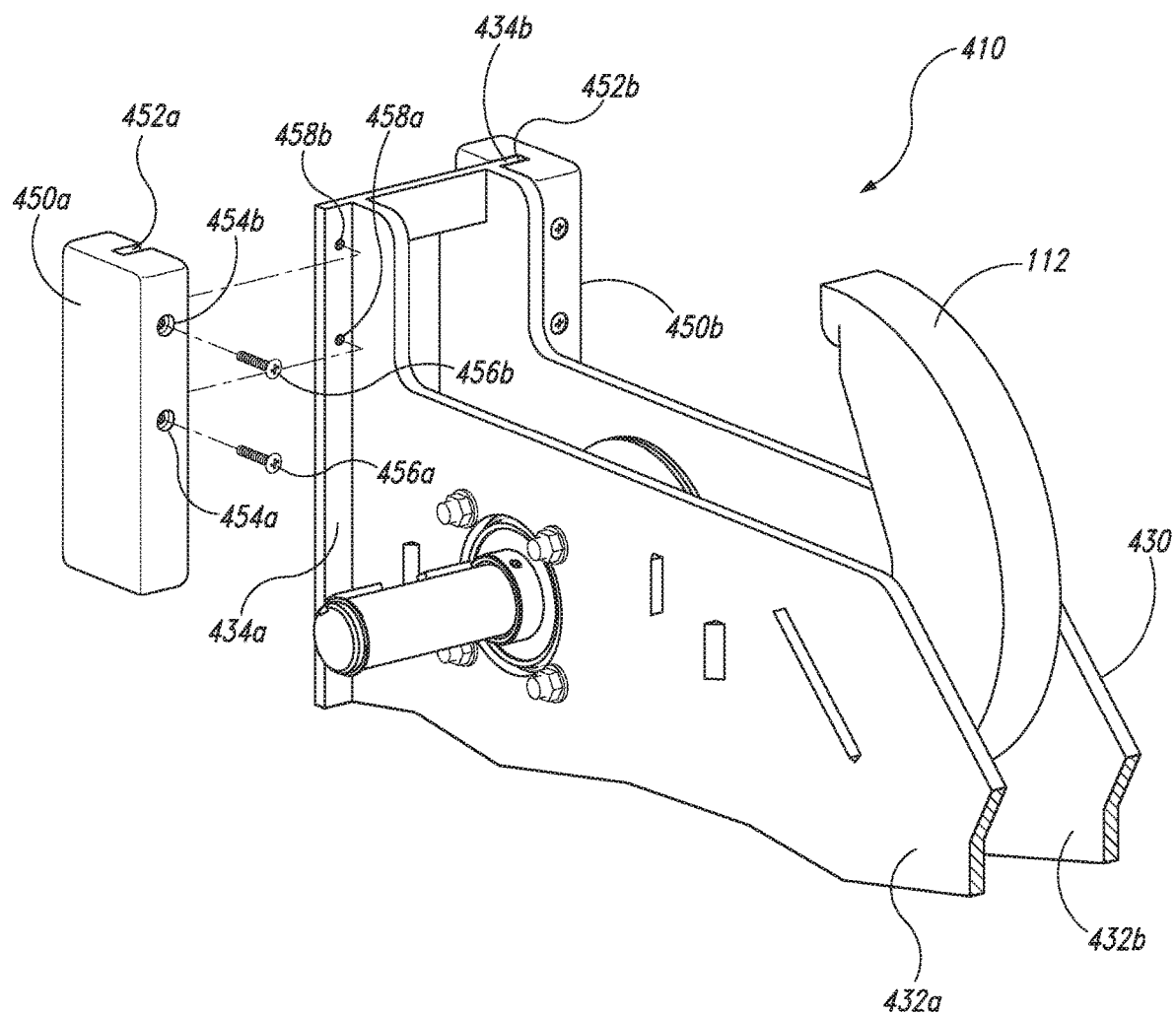
FIG. 4 is a partially exploded isometric view of a vehicle restraint carriage assembly configured in accordance with another embodiment of the present technology.

FIG. 4 is a partially exploded isometric view of a carriage assembly 410 configured in accordance with another embodiment of the present technology. The carriage assembly 410 can be at least generally similar in structure and function to the carriage assembly 110 described in detail above. Accordingly, carriage assembly 410 includes a restraint hook 112 pivotally coupled to a frame 430 between a first side plate 432a and a second side plate 432b. Additionally, the carriage assembly 410 further includes a first guide block 450a and a second guide block 450b configured to slidably engage the corresponding channels 128a, b of the guide track 122.

In one aspect of the illustrated embodiment, however, the guide blocks 450a, b are not attached to the frame 430 by means of cross shafts (e.g., the shafts 248 and 252 of FIG. 2B). Rather, in the illustrated embodiment, each of the side plates 432a, b includes a corresponding vertical flange 434a,b that extends laterally outward proximate the forward edge portion of each of the respective side plates 432a, b. Each of the guide blocks 450a, b includes a corresponding slot 452a, b that is configured to slip over or otherwise receive the corresponding flange 434a, b to thereby mount the guide block 450a, b to the respective flange 434a, b. The guide blocks 450a, b can be secured to the corresponding flanges 434a, b with one or more fasteners 456a, b (e.g., screws or bolts) that extend through countersunk holes 454a, b in the guide blocks 450a, b and threadably engage corresponding holes 458a, b in the flanges 434a, b. Aside from the method of mounting the guide blocks 450a, b to the frame 430 as described above, the carriage assembly 410 can be operably mounted to the track assembly 120 in the manner described above with respect to the carriage assembly 210. As FIG. 4 illustrates, the guide blocks 450a, b (250a, b) can be mounted to the carriage assembly 410 (210) in a number of different ways, and unless otherwise specified the present technology is not limited to any particular mounting method.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment.

Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples and embodiments of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples: alternative implementations may employ differing values or ranges.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

I claim:

1. A vehicle restraint comprising:
   a track assembly configured to be mounted to a face of a loading dock, the track assembly including a guide track; and a carriage assembly movably coupled to the track assembly, the carriage assembly including
a frame;
an engagement member operably coupled to the frame, wherein the engagement member is configured to engage a RIG bar of a vehicle positioned at the loading dock, and wherein at least one of the frame or the engagement member includes a horizontal contact surface configured to contact the RIG bar;
at least one roller operably coupled to the frame, wherein the at least one roller rotatably engages the guide track at a first position; and
at least one guide block operably coupled to the frame, wherein the at least one guide block is-slidably engages the guide track at a second position, different than the first position, and wherein the at least one guide block includes a first vertical contact surface portion positioned above the horizontal contact surface and a second vertical contact surface portion positioned below the horizontal contact surface.

2. The vehicle restraint of claim 1 wherein the at least one roller is rotatably received in the guide track.

3. The vehicle restraint of claim 2 wherein the second position is above the first position.

4. The vehicle restraint of claim 1 wherein the guide track includes at least one substantially flat vertical flange, and wherein at least one of the first or second vertical contact surface portions is a substantially flat contact surface portion configured to slide against the vertical flange during operation of the vehicle restraint.

5. The vehicle restraint of claim 1 wherein the guide track includes at least one substantially flat vertical flange, and wherein the first and second vertical contact surface portions together form a substantially flat, rectangular contact surface configured to slide against the vertical flange in lengthwise orientation during operation of the vehicle restraint.

6. The vehicle restraint of claim 1 wherein the frame includes the horizontal contact surface configured to contact the RIG bar and wherein at least one of the first or second vertical contact surface portions of the at least one guide block is substantially horizontally adjacent to the horizontal contact surface of the frame.

7. The vehicle restraint of claim 1 wherein the frame includes the horizontal contact surface configured to contact the RIG bar and wherein the first and second vertical contact surface portions of the at least one guide block are perpendicular to the horizontal contact surface of the frame.

8. The vehicle restraint of claim 1 wherein the guide track includes at least one channel having a first cross-sectional shape, and wherein the at least one guide block has a second cross-sectional shape that is substantially equivalent to the first cross-sectional shape.

9. The vehicle restraint of claim 1 wherein the guide track includes a first channel and a second channel, wherein the at least one guide block is a first guide block slidably received in the first channel, and wherein the carriage assembly further includes a second guide block operably coupled to the frame and slidably received in the second channel.

10. The vehicle restraint of claim 1:
wherein the frame includes a first side plate and a second side plate spaced apart from the first side plate;
wherein the engagement member is a hook rotatably positioned between the first and second side plates;
wherein the guide track includes a first channel and a second channel;
wherein the at least one guide block is a first guide block fixedly attached to the first side plate and slidably received in the first channel; and
wherein the carriage assembly further includes a second guide block fixedly attached to the second side plate and slidably received in the second channel.

11. The vehicle restraint of claim 10 wherein the at least one roller is a first roller rotatably attached to the first side plate below the first guide block, and wherein the carriage assembly further includes:
a second roller rotatably attached to the second side plate below the second guide block, wherein the second roller is rotatably received in the second channel.

12. The vehicle restraint of claim 1, further comprising one or more biasing members operably coupled between the carriage assembly and the track assembly, wherein the one or more biasing members resiliently bias the carriage assembly toward an upper position relative to the track assembly, and wherein contact between the frame and the RIG bar of the vehicle during engagement of the vehicle drives the carriage assembly away from the upper position against the bias of the biasing members.

13. The vehicle restraint of claim 1 wherein the at least one guide block is formed from a high strength polymer.

14. The vehicle restraint of claim 1 wherein the at least one roller and the at least one guide block are formed from high strength polymers.

15. A vehicle restraint for use at a loading dock, the vehicle restraint comprising:
a guide track configured to be fixedly attached to a face of a loading dock, the guide track having a first vertical channel spaced apart from a second vertical channel;
a carriage assembly configured to move upwardly and downwardly on the guide track, the carriage assembly including
means for engaging a RIG bar of a vehicle positioned at the loading dock, wherein the means for engaging the RIG bar include a RIG bar contact surface;
means for slidably engaging the first vertical channels, wherein the means for slidably engaging the first vertical channel include a first vertical contact surface portion positioned above the RIG bar contact surface and a second vertical contact surface portion positioned below the RIG bar contact surface;
means for slidably engaging the second vertical channel, wherein the means for slidably engaging the second vertical channel include a first vertical contact surface portion positioned above the RIG bar contact surface and a second vertical contact surface portion positioned below the RIG bar contact surface; and
means for rotatably engaging the first and second vertical channels.

16. The vehicle restraint of claim 15 wherein the means for slidably engaging the first and second vertical channels include non-rolling contact surfaces.

17. The vehicle restraint of claim 15 wherein the means for slidably engaging the first and second vertical channels include means for applying pull loads from the vehicle to the first and second vertical channels, respectively.

18. The vehicle restraint of claim 15 wherein the means for slidably engaging the first and second vertical channels are positioned above the means for rotatably engaging the first and second vertical channels.

19. The vehicle restraint of claim 15 wherein the means for engaging the RIG bar include a pivotable hook configured to engage the RIG bar at a vertical position that is substantially horizontally aligned with the means for slidably engaging the first and second vertical channels.

* * * * *